(12) United States Patent
Seo et al.

(10) Patent No.: US 8,503,091 B2
(45) Date of Patent: Aug. 6, 2013

(54) LENS SYSTEM AND PHOTOGRAPHING APPARATUS HAVING THE SAME

(75) Inventors: Jung-pa Seo, Gwangmyeong-si (KR); Jang-hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 13/046,881

(22) Filed: Mar. 14, 2011

(65) Prior Publication Data

US 2011/0222164 A1     Sep. 15, 2011

(30) Foreign Application Priority Data

Mar. 12, 2010   (KR) .................. 10-2010-0022434

(51) Int. Cl.
    *G02B 15/02* (2006.01)
(52) U.S. Cl.
    USPC .......................... 359/672; 359/676

(58) Field of Classification Search
    USPC .................. 359/676–683, 686–690, 672
    See application file for complete search history.

(56) References Cited

U.S. PATENT DOCUMENTS

| 7,580,199 | B2 * | 8/2009 | Yakita | 359/676 |
| 2007/0058264 | A1 * | 3/2007 | Yakita | 359/676 |
| 2011/0134542 | A1 * | 6/2011 | Lee | 359/689 |

FOREIGN PATENT DOCUMENTS

JP     2009-014931 A    1/2009

* cited by examiner

*Primary Examiner* — Darryl J Collins
(74) *Attorney, Agent, or Firm* — Drinker Biddle & Reath LLP

(57) ABSTRACT

A lens system and a photographing apparatus including the lens system are provided, the lens system including a first sub lens system that includes a plurality of lens groups, and a second sub lens system that includes a replacement lens group that replaces or is replaced by some of the plurality of lens groups.

18 Claims, 20 Drawing Sheets

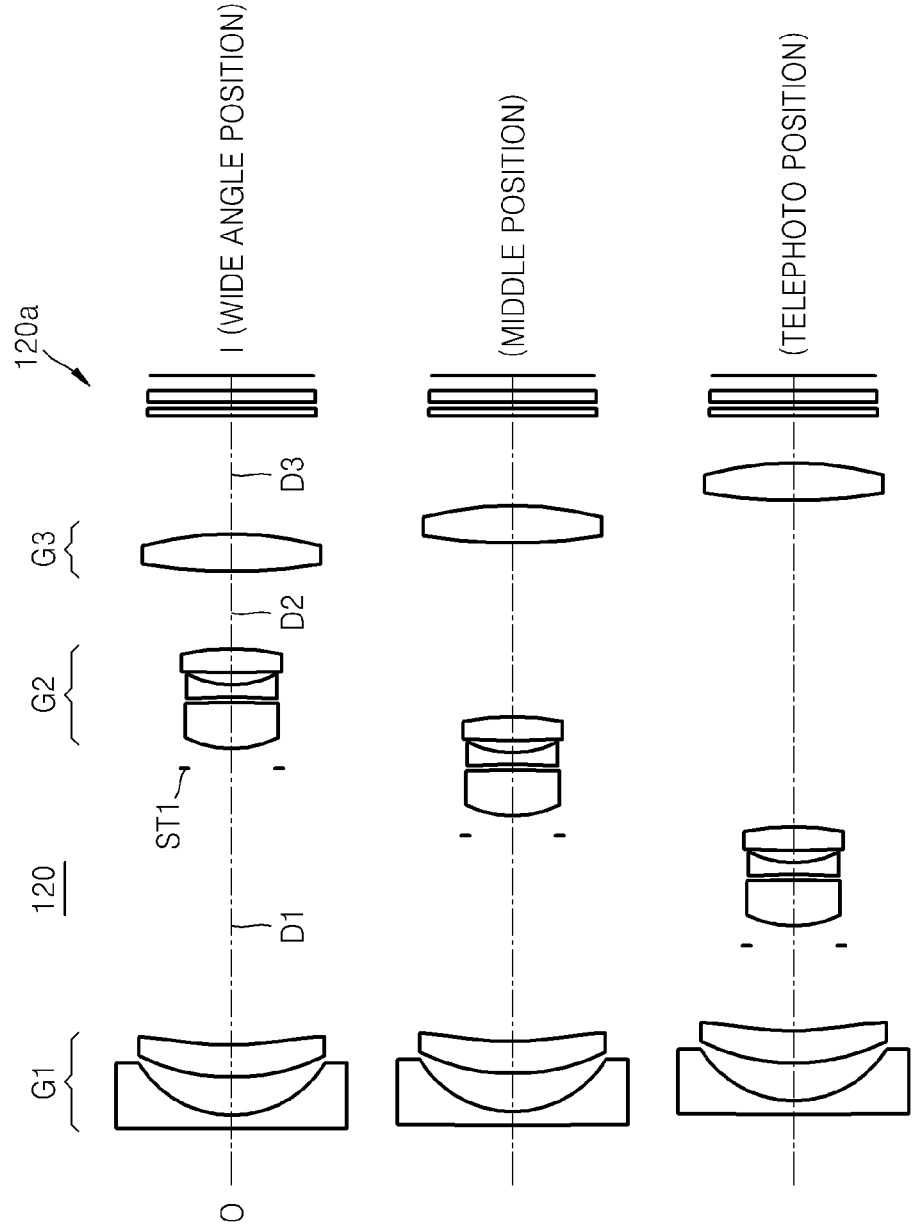

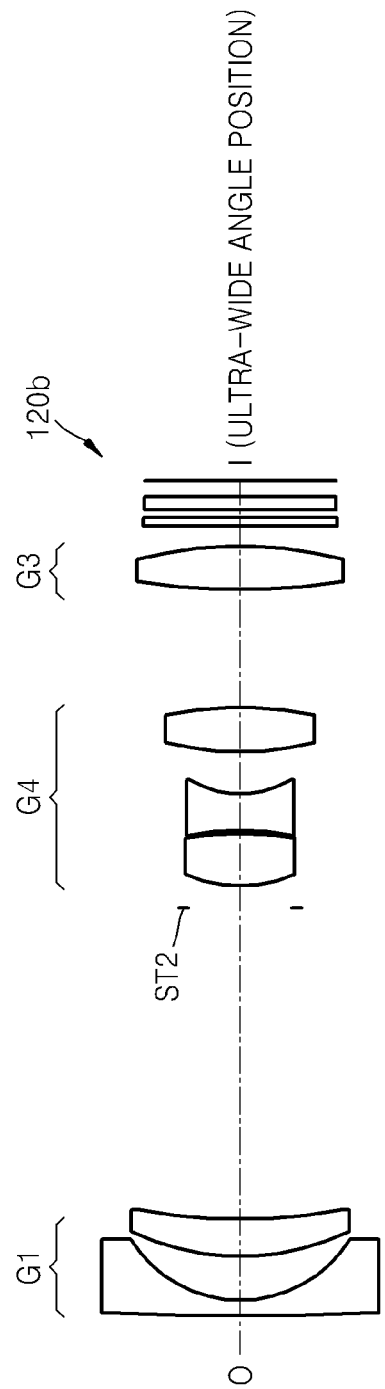

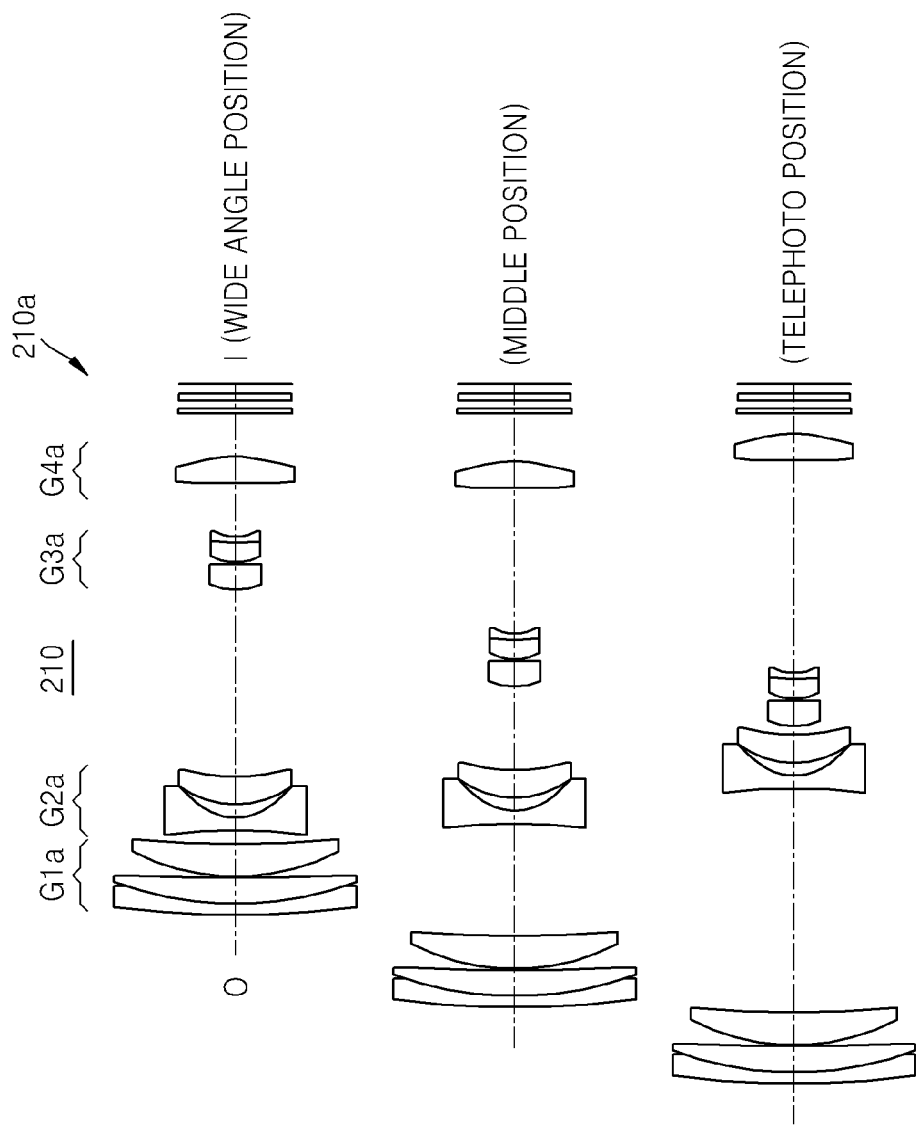

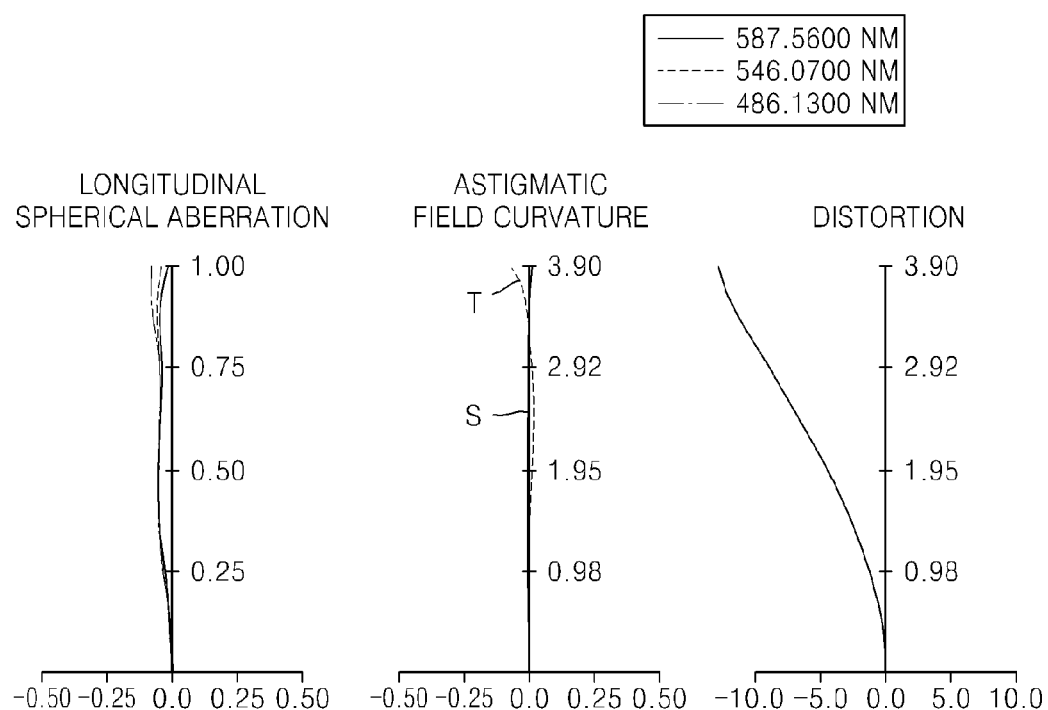

LENS SYSTEM AND PHOTOGRAPHING APPARATUS HAVING THE SAME

CROSS-REFERENCE TO RELATED PATENT APPLICATION

This application claims the benefit of Korean Patent Application No. 10-2010-0022434, filed on Mar. 12, 2010, in the Korean Intellectual Property Office, the disclosure of which is incorporated herein in its entirety by reference.

BACKGROUND

Various embodiments of the invention relate to a lens-replaceable lens system and a photographing apparatus including the lens-replaceable lens system.

Photographing apparatuses, such as digital cameras or cellular phone cameras that use imaging devices, such as charge-coupled devices (CCDs) or complementary metal-oxide semiconductors (CMOSs), are required to be compact, lightweight, and inexpensive. Together with these demands, various optical performances are also required. For example, zoom lens systems are different in terms of optical characteristics according to the types of lens groups used. Users should select zoom lenses for a photographing apparatus according to intended uses of the photographing apparatus. For example, if a user wants to photograph a landscape, the user should select a wide-angle zoom lens system having an excellent wide angle performance and a wide viewing angle. In order to photograph a remote subject, a user should select a telephoto zoom lens system having a narrow viewing angle and a long focal length. As such, users should purchase different zoom lenses for different photographing purposes, and thus zoom lens systems may need to be replaced between photographing.

SUMMARY

According to an embodiment of the invention, there is provided a lens system having various types of focal lengths as a single lens system.

According to another embodiment of the invention, there is provided a photographing apparatus that achieves various types of focal lengths by using a single lens system.

According to an embodiment of the invention, there is provided a lens system including a first sub lens system that includes at least one lens group and a first replacement lens group and performs zooming between a wide angle position and a telephoto position; and a second sub lens system that shares the at least one lens group with the first sub lens system, includes a second replacement lens group that replaces or is replaced by the first replacement lens group, and has a focal length shorter than a focal length of the first sub lens system at the wide angle position.

The at least one lens group may include a lens group having a negative refractive power, and the first replacement lens group may be disposed between the lens group having the negative refractive power and an image plane.

The first sub lens system may include a first lens group having a negative refractive power, a second lens group having a positive refractive power, and a third lens group having a positive refractive power. The second replacement lens group may replace or is replaced by the second lens group or the third lens group.

When the first sub lens system performs zooming from the wide angle position to the telephoto position, an interval between the first lens group and the second lens group may decrease and an interval between the second lens group and the third lens group may increase.

The third lens group may perform focusing.

The first sub lens system may include a first lens group having a positive refractive power, a second lens group having a negative refractive power, a third lens group having a positive refractive power, and a fourth lens group having a positive refractive power. The second replacement lens group may replace or may be replaced by the third lens group or the fourth lens group.

The second replacement lens group may include one lens.

The second sub lens system may have a viewing angle of 90 degrees or greater.

The second sub lens system may have a distortion of 15% or greater.

The first replacement lens group and the second replacement lens group may include at least one aspherical surface.

The lens system may satisfy the following equation:

$$0.6 < EFL2/EFL1 < 1.1$$

where EFL1 represents a focal length of the first replacement lens group and EFL2 represents a focal length of the second replacement lens group.

According to another embodiment of the invention, there is provided a lens system including a first sub lens system that includes at least one lens group and a first replacement lens group and performs zooming between a wide angle position and a telephoto position; and a second sub lens system that shares the at least one lens group with the first sub lens system and includes a second replacement lens group that replaces or is replaced by the first replacement lens group, wherein the first replacement lens group includes a first stop, the second replacement lens group includes a second stop. When the first replacement lens group is replaced by the second replacement lens group, the second sub lens system may have an F number smaller than an F number of the first sub lens system at the wide angle position.

According to another embodiment of the invention, there is provided a photographing apparatus including a lens system; and an imaging device for converting an image formed by the lens system into an electrical signal, wherein the lens system includes a first sub lens system that includes at least one lens group and a first replacement lens group and is for performing zooming between a wide angle position and a telephoto position; and a second sub lens system that shares the at least one lens group with the first sub lens system, includes a second replacement lens group that replaces or is replaced by the first replacement lens group, and has a focal length shorter than a focal length of the first sub lens system at the wide angle position.

BRIEF DESCRIPTION OF THE DRAWINGS

The above and other features and advantages of the invention will become more apparent by describing in detail exemplary embodiments thereof with reference to the attached drawings in which:

FIG. 2A are pictorial side views illustrating a first lens system of a lens system according to an embodiment of the invention;

FIG. 2B is a pictorial side view illustrating a second lens system of the lens system according to the embodiment illustrated in FIG. 2A;

FIG. 4A are pictorial side views illustrating a first lens system of a lens system according to another embodiment of the invention;

FIG. 7D is a graph showing longitudinal spherical aberration, astigmatic field curvature, and distortion of the second lens system illustrated in FIG. 6B.

DETAILED DESCRIPTION

A lens system according to various embodiments of the invention and a photographing apparatus including the lens system will now be described more fully with reference to the accompanying drawings, in which exemplary embodiments of the invention are shown.

Figure 1:
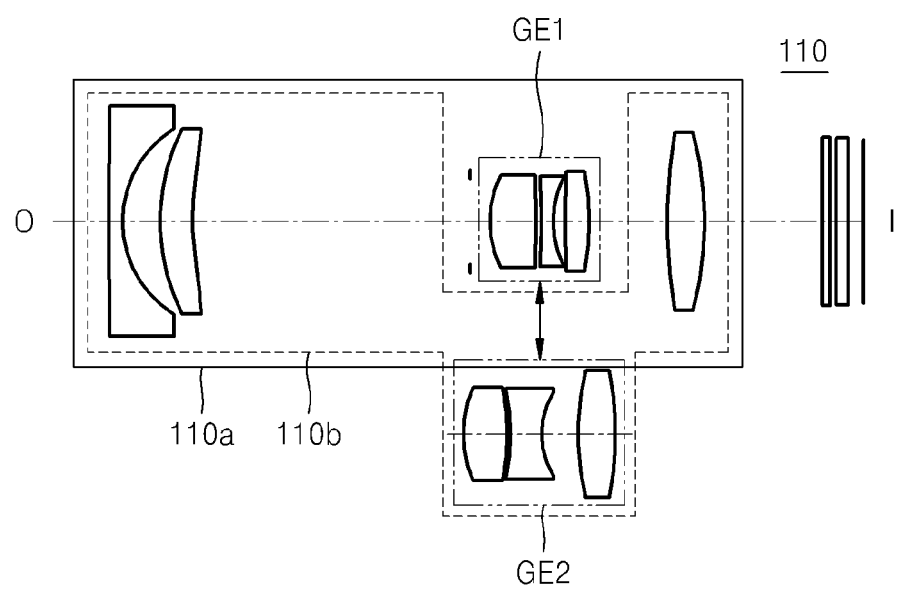
FIG. 1 is a schematic side illustration of a lens system according to an embodiment of the invention.

A lens system according to an embodiment of the invention includes a plurality of lens groups, among which some lens groups are replaceable and may be replaced by other replacement lens groups to achieve different types of focal lengths. Referring to FIG. 1, a lens system 110 according to an embodiment of the invention includes a first sub lens system 110a including at least one lens group and a first replacement lens group GE1, and a second sub lens system 110b including the at least one lens groups and a second replacement lens group GE2 that may replace or may be replaced by the first replacement lens group GE1. The first sub lens system 110a and the second sub lens system 110b may share lens groups other than lens groups that may be replaced between the first and second sub lens system 110a and 110b. The first sub lens system 110a may include, for example, a zoom lens system, and the second sub lens system 110b may include a single-focus lens system. The second sub lens system 110b may have a focal length shorter than a focal length of the first sub lens system 110a at a wide angle position.

Alternatively, the first sub lens system 110a and the second sub lens system 110b may include zoom lens systems having different zoom magnifications, respectively. For example, the first sub lens group 110a may include a lens group having a negative refractive power, and the first replacement lens group GE1 may be disposed between the lens group having the negative refractive power and an image plane and may be replaced by the second replacement lens group GE2. When the first replacement lens group GE1 is replaced by the second replacement lens group GE2, the first replacement lens group GE1 is moved off an optical axis and the second replacement lens group GE2 is moved to be aligned with the optical axis.

As described above, the lens system 110 according to the embodiment of the invention is constructed to include a zoom lens system and a single-focus lens system in a single lens system, whereby the single lens system may obtain various magnifications. In other words, the single lens system replaces some lens groups without needing to include a zoom lens and a wide-angle lens separately, thereby achieving various focal lengths. Since the first sub lens system 110a and the second sub lens system 110b share some lens groups and an imaging device, the number of components used to form the lens system 110 is reduced compared to a lens system including two types of lens systems separately, and the lens system 110 may be manufactured compactly and thinly at a low material cost.

FIG. 2A illustrates a lens system 120 according to an embodiment of the invention at a wide angle position, a middle position, and a telephoto position. FIG. 2B illustrates the lens system 120 at an ultra-wide angle position. The lens system 120 includes a first sub lens system 120a having a first replacement lens group and a second sub lens system 120b having a second replacement lens group. The first sub lens system 120a and the second sub lens system 120b share lens groups other than the replacement lens groups. The first sub lens system 120a may include a first lens group G1, a second lens group G2, and a third lens group G3, for example, in a sequence from an object side O to an image side I, and the second sub lens system 120b may include the first lens group G1, a fourth lens group G4 that may replace or be replaced by the second lens group G2, and the third lens group G3. The first lens group G1 may have a negative refractive power, the second lens group G2 may have a positive refractive power, and the third lens group G3 may have a positive refractive power. In this embodiment, the second lens group G2 is used as the first replacement lens group, and the fourth lens group G4 is used as the second replacement lens group. When the first sub lens system 120a is changed to the second sub lens system 120b, the second lens group G2 may be moved off an optical axis and the fourth lens group G4 may be moved to be aligned with the optical axis.

When the first sub lens system 120a performs zooming from the wide angle position to the telephoto position, an interval between the first and second lens groups G1 and G2 may decrease, and an interval between the second and third lens groups G2 and G3 may increase. In this case, the second lens group G2 may be moved toward the object side O. The third lens group G3 may perform focusing.

Figure 3A:
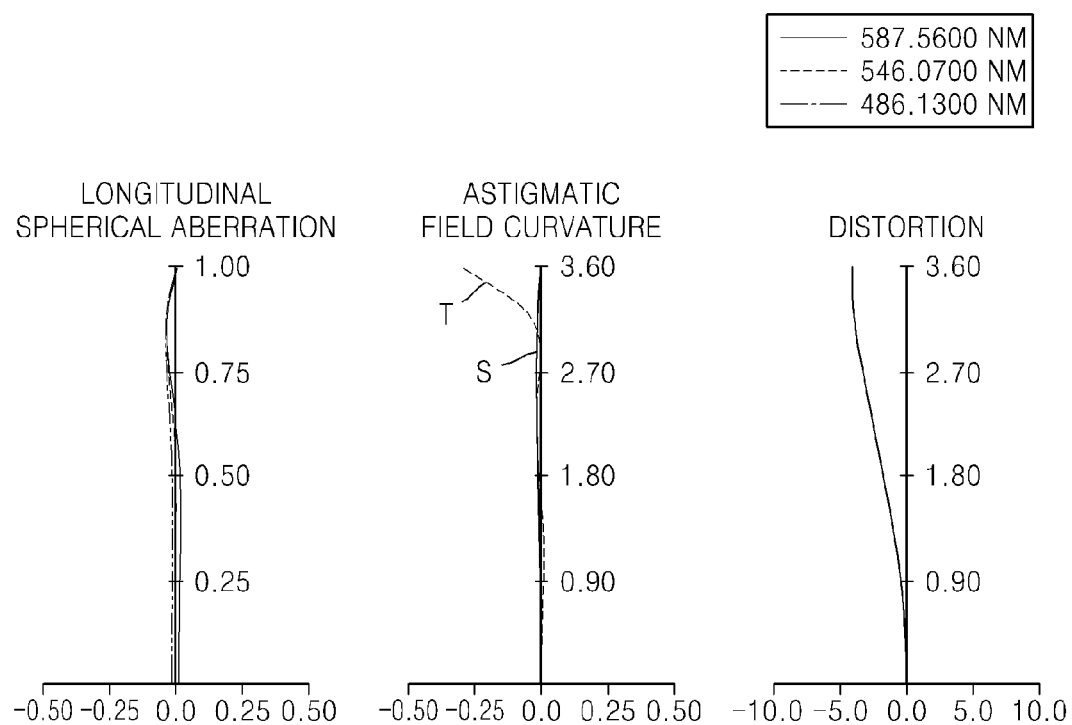
FIGS. 3A, 3B, and 3C illustrate longitudinal spherical aberration, astigmatic field curvature, and distortion of the first lens system illustrated in FIG. 2A at a wide angle position, a middle position, and a telephoto position.
Figure 3B:
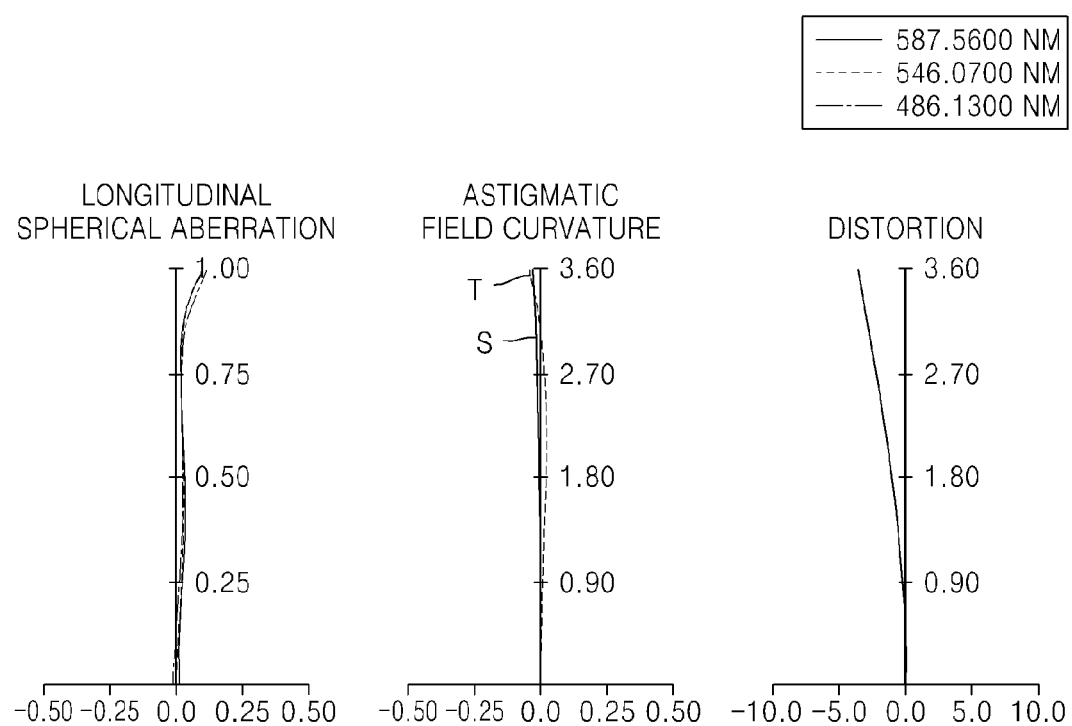
Figure 3C:
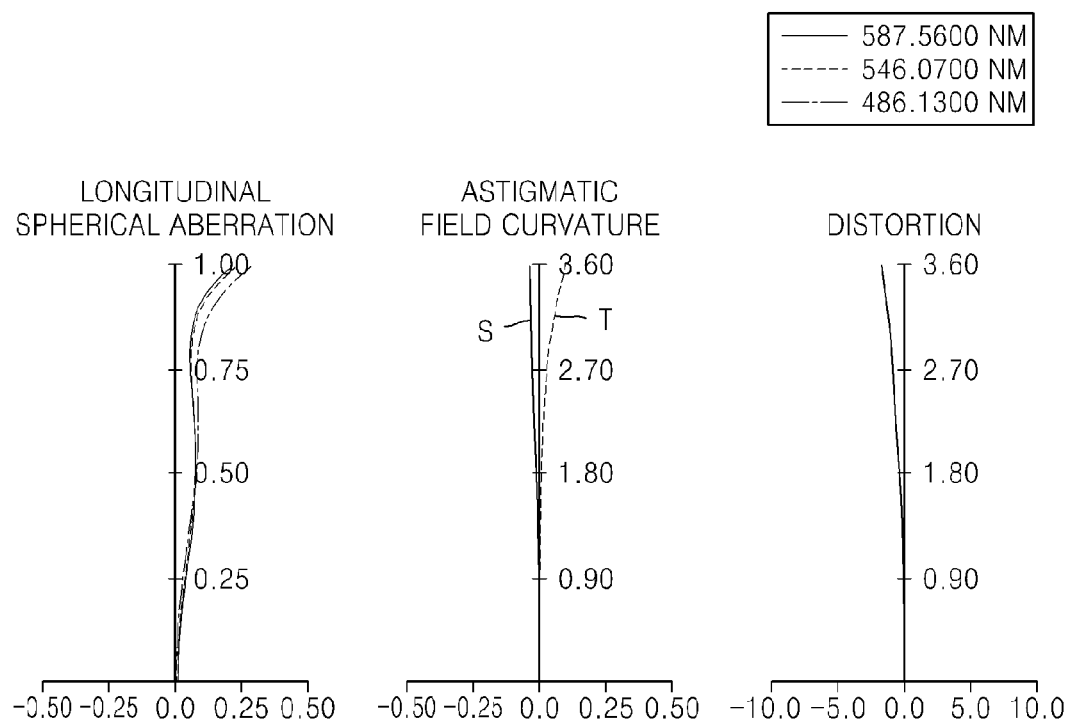
Figure 3D:
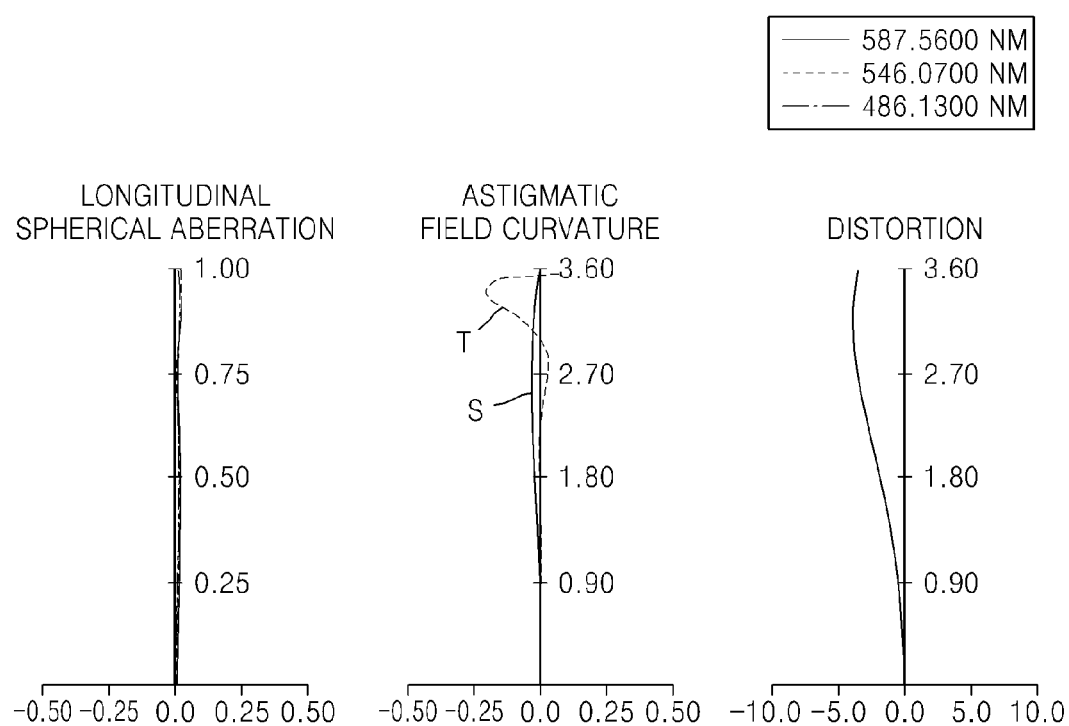
FIG. 3D are graphs showing longitudinal spherical aberration, astigmatic field curvature, and distortion of the second lens system illustrated in FIG. 2B.

FIG. 3A illustrates longitudinal spherical aberration, astigmatic field curvature, and distortion of the first lens system 120a illustrated in FIG. 2A at a wide angle position. A tangential field curvature T and a sagittal field curvature S are illustrated to indicate the astigmatic field curvature. In the distortion, a vertical axis represents an image height IMG HT. FIGS. 3B and 3C illustrate longitudinal spherical aberration, astigmatic field curvature, and distortion of the first lens system 120a illustrated in FIG. 2A at a middle position and the telephoto position. FIG. 3D illustrates longitudinal spherical aberration, astigmatic field curvature, and distortion of the second lens system 120b illustrated in FIG. 2B at an ultra-wide angle position.

Figure 4B:
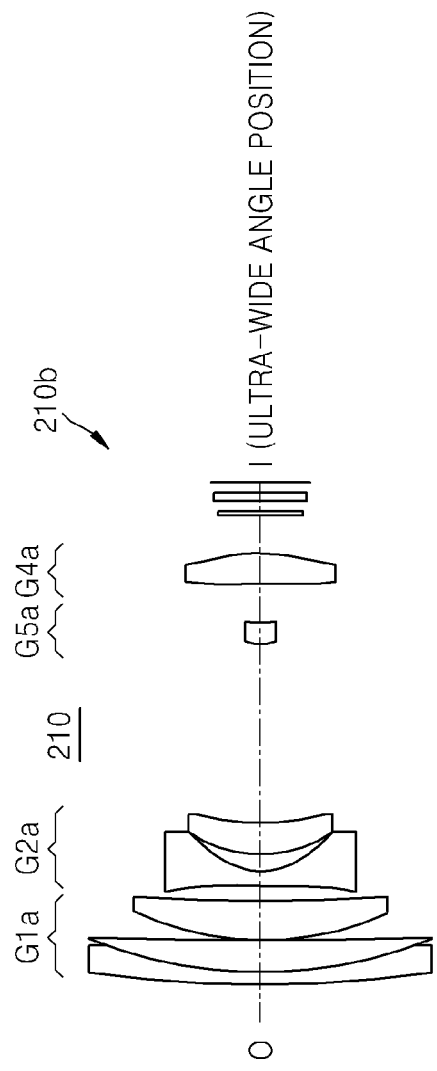
FIG. 4B is a pictorial side view illustrating a second lens system of the lens system according to the embodiment illustrated in FIG. 4A.

FIGS. 4A and 4B illustrate a lens system 210 according to another embodiment of the invention. The lens system 210 may include a first sub lens system 210a and a second sub lens system 210b. The first sub lens system 210a may include a first lens group G1a, a second lens group G2a, a third lens group G3a, and a fourth lens group G4a, for example, in a sequence from an object side O to an image side I, and the second sub lens system 210b may include the first lens group G1a, the second lens group G2a, a fifth lens group G5a that may replace or be replaced by the third lens group G3a, and the fourth lens group G4a. The third lens group G3a is used as a first replacement lens group and the fifth lens group G5a is used as a second replacement lens group. When the first sub lens system 210a is changed to the second sub lens system 210b, the third lens group G3a may be moved off an optical axis and the fifth lens group G5a may be moved to be aligned with the optical axis.

The first sub lens system 210a may be a zoom lens system capable of continuously changing a focal length, and the second sub lens system 210b may be an ultra-wide angle lens system. The fifth lens group G5a may include one lens. Thereby, when a camera having the firth lens group G5a performs retracting, the size of the camera may be reduced and thus the camera may be made compact.

The second sub lens system 210b may have a viewing angle of 90 degrees or greater. Alternatively, the second sub lens system 210b may have a distortion of 15% or greater. As described above, an effect of a fisheye lens may be obtained by replacement of the second replacement lens group G5a of the second sub lens system 210b. The second sub lens system 210b having a fisheye lens effect does not have a strict limit to distortion aberration and thus may have fewer lenses or a smaller size than the first replacement lens group G3a of the first sub lens system 210b.

Figure 5A:
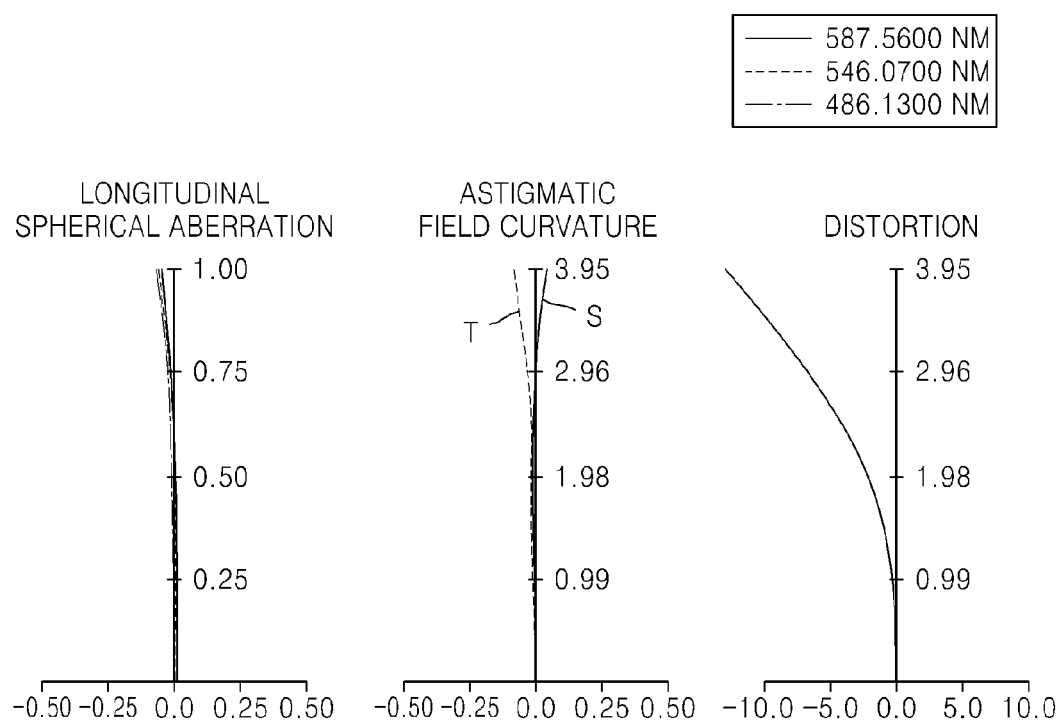
FIGS. 5A, 5B, and 5C are graphs showing longitudinal spherical aberration, astigmatic field curvature, and distortion of the first lens system illustrated in FIG. 4A at a wide angle position, a middle position, and a telephoto position.
Figure 5B:
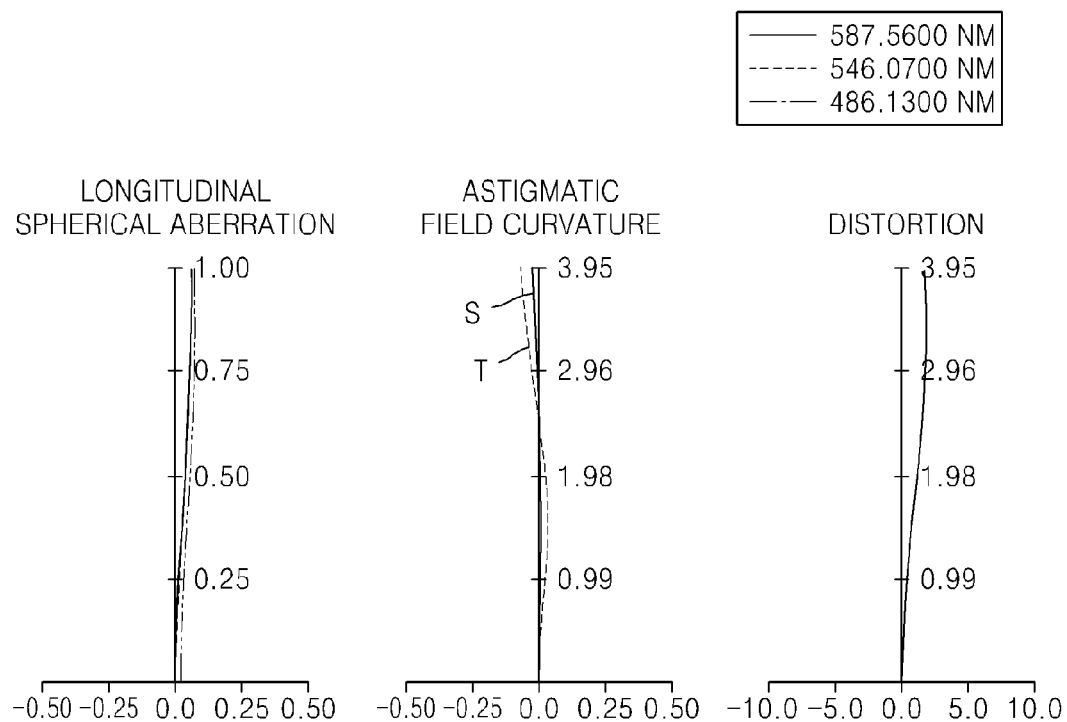
Figure 5C:
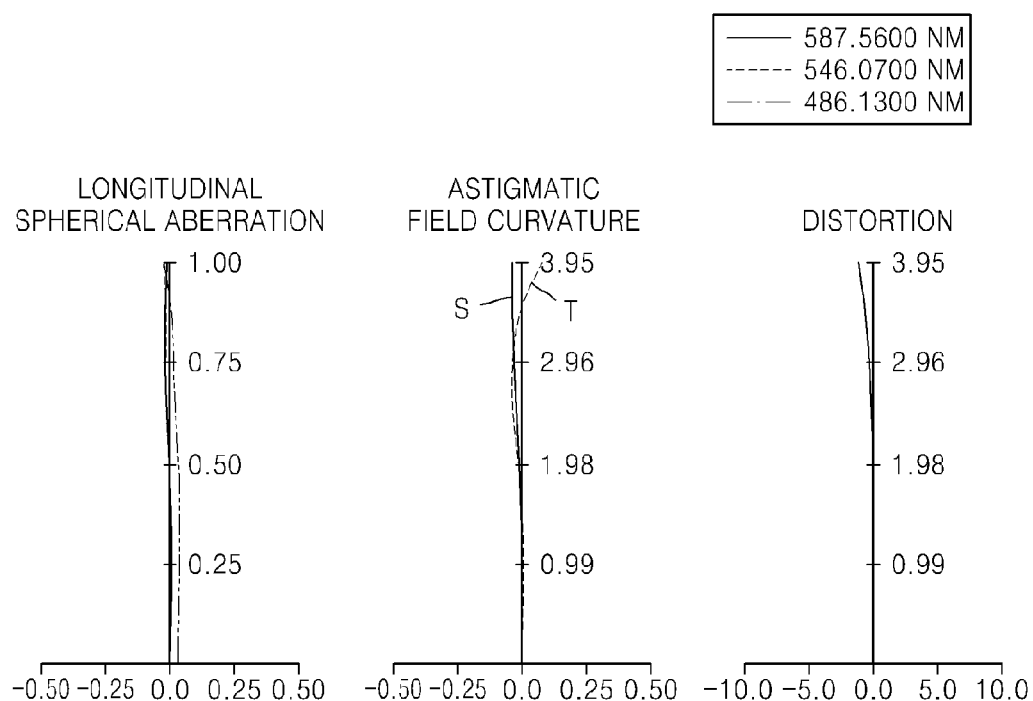
Figure 5D:
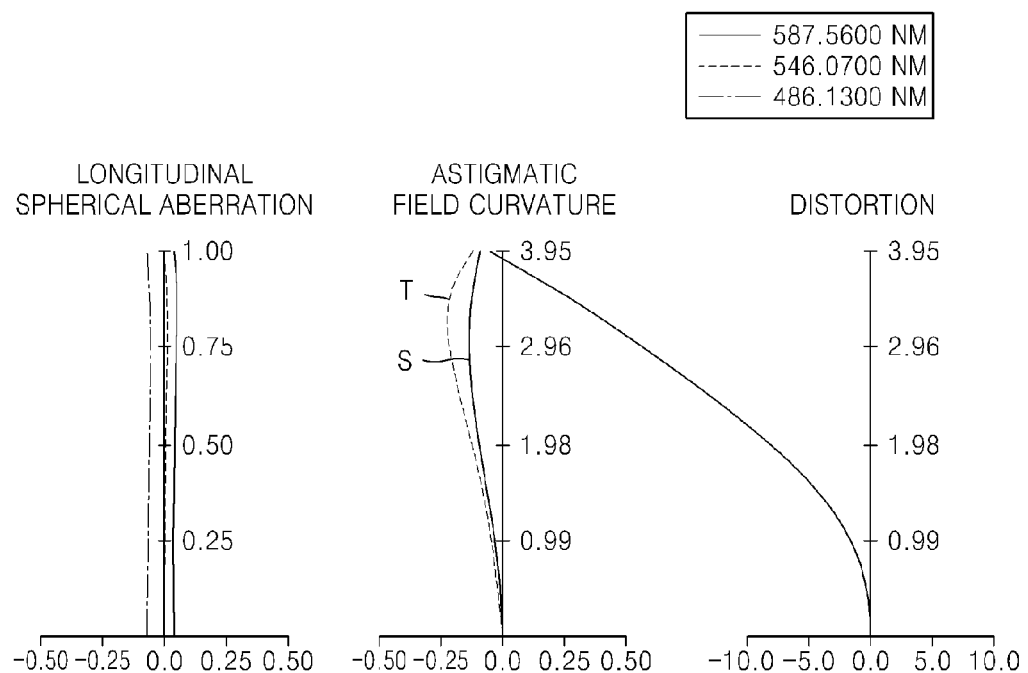
FIG. 5D is a graph showing longitudinal spherical aberration, astigmatic field curvature, and distortion of the second lens system illustrated in FIG. 4B.

FIGS. 5A, 5B, and 5C illustrate longitudinal spherical aberration, astigmatic field curvature, and distortion of the first lens system 210a illustrated in FIG. 4A at a wide angle position, a middle position, and a telephoto position. FIG. 5D illustrates longitudinal spherical aberration, astigmatic field curvature, and distortion of the second lens system 210b illustrated in FIG. 4B at an ultra-wide angle position.

Figure 6A:
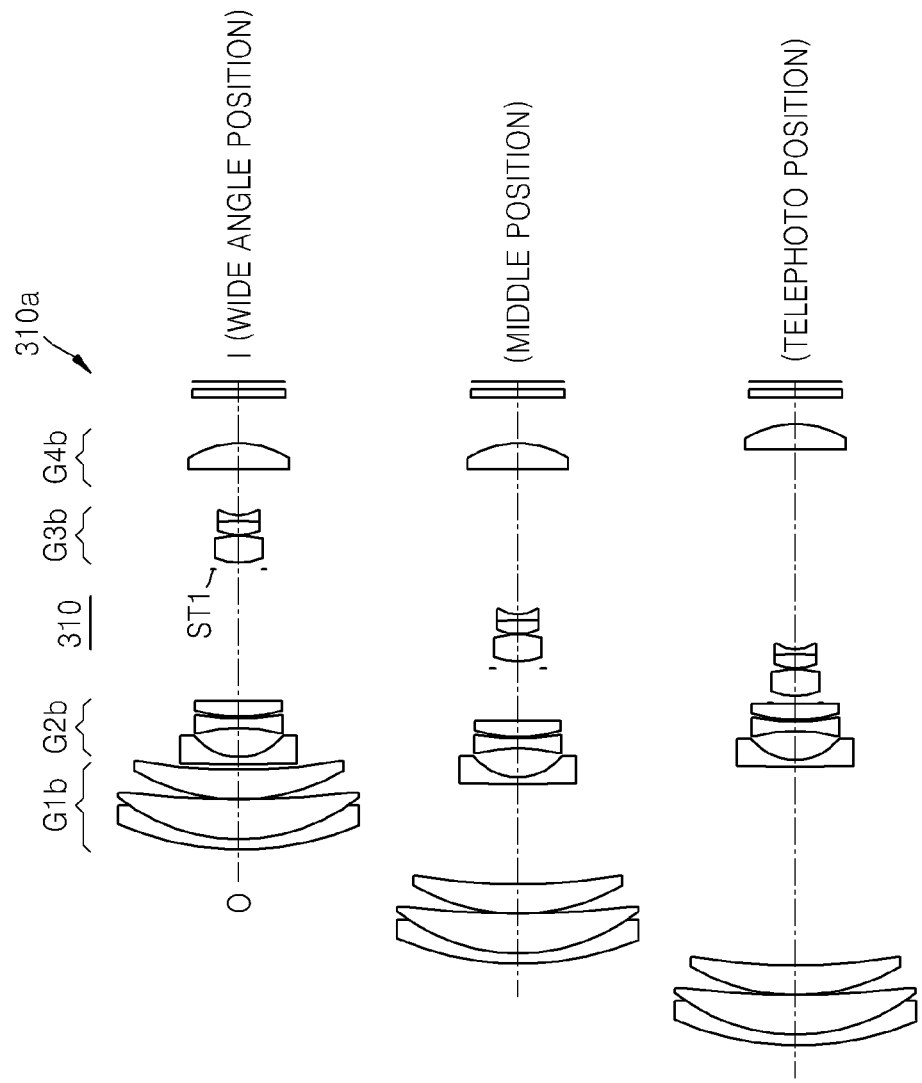
FIG. 6A are pictorial side views illustrating a first lens system of a lens system according to another embodiment of the invention.
Figure 6B:
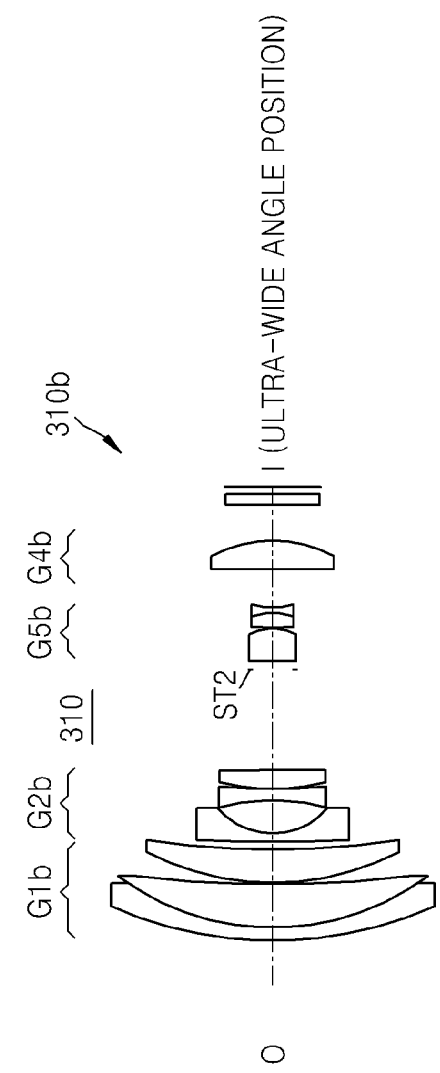
FIG. 6B is a pictorial side view illustrating a second lens system of the lens system according to the embodiment illustrated in FIG. 6A.

FIG. 6A illustrates a first lens system 310a of a lens system 310 according to another embodiment of the invention. FIG. 6B illustrates a second lens system 310b of the lens system 310 of FIG. 6A. The first sub lens system 310a may include a first lens group G1b, a second lens group G2b, a third lens group G3b, and a fourth lens group G4b, for example, in a sequence from an object side O to an image side I, and the second sub lens system 310b may include the first lens group G1b, the second lens group G2b, a fifth lens group G5b that may replace or be replaced by the third lens group G3b, and the fourth lens group G4b. The third lens group G3b is used as a first replacement lens group, and the fifth lens group G5b is used as a second replacement lens group. The fifth lens group G5b may include, for example, three lenses. The first lens group G1b, may have, for example, a positive refractive power, the second lens group G2b may have a negative refractive power, the third lens group G3b may have a positive refractive power, and the fourth lens group G4b may have a positive refractive power. The fifth lens group G5b may have a positive refractive power. However, the invention is not limited thereto.

The third lens group G3b may include a first stop ST1, and the fifth lens group G5b may include a second stop ST2. Due to the inclusion of stops in the replacement lens groups, the second sub lens system 310b may have an F number smaller than the F number of the first sub lens system 310a at the wide angle position. For example, the focal lengths of the first sub lens system 310a and the second sub lens system 310b may not be changed but only the F numbers thereof may be changed. Alternatively, not only the focal lengths but also the F numbers of the first sub lens system 310a and the second sub lens system 310b may be changed.

When the first sub lens system 310a performs zooming from the wide angle position to the telephoto position, all of intervals between the first lens group G1, the second lens group G2, the third lens group G3, and the fourth lens group G4 may be changed. The second sub lens system 310b may have a shorter focal length than the focal length of the first sub lens system 310a at the wide angle position.

Figure 7A:
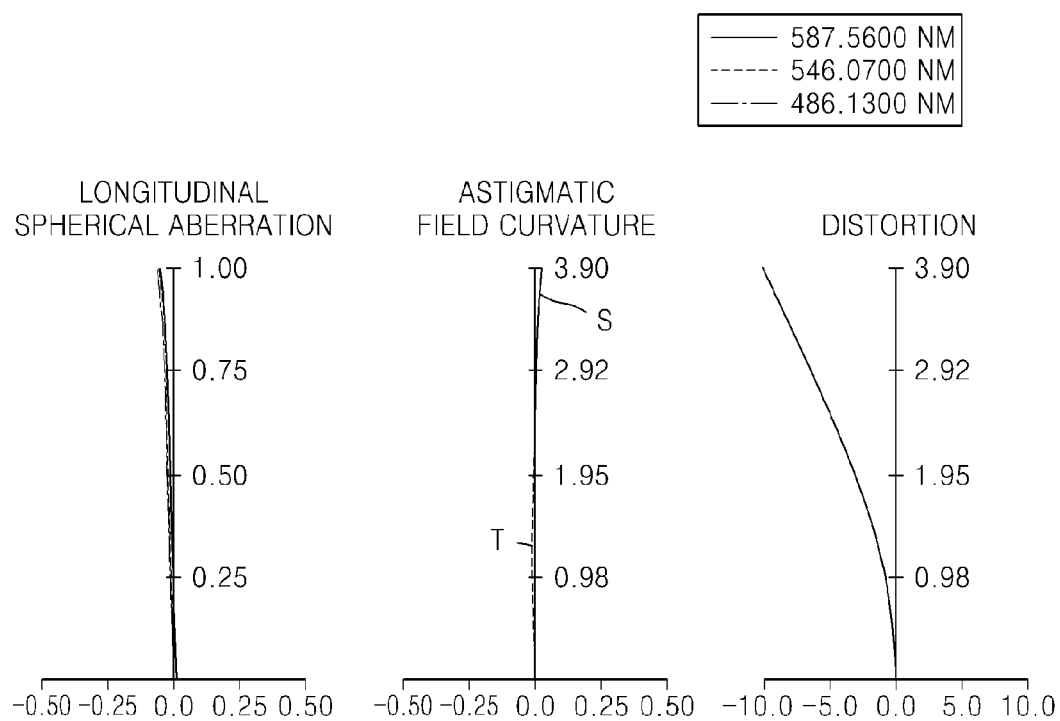
FIGS. 7A, 7B, and 7C are graphs showing longitudinal spherical aberration, astigmatic field curvature, and distortion of the first lens system illustrated in FIG. 6A at a wide angle position, a middle position, and a telephoto position.
Figure 7B:
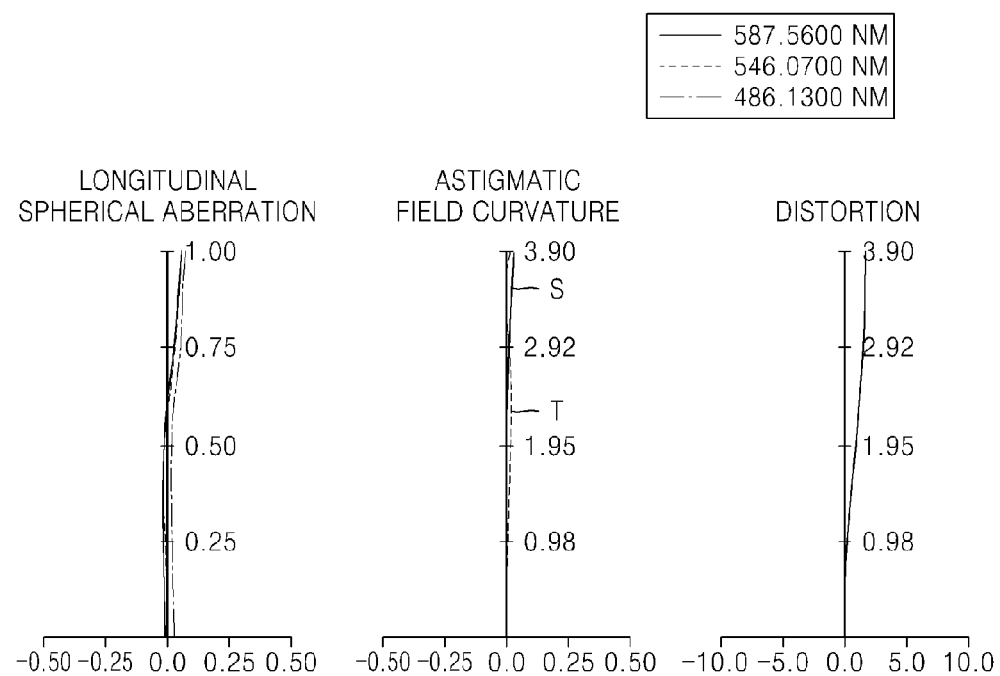
Figure 7C:
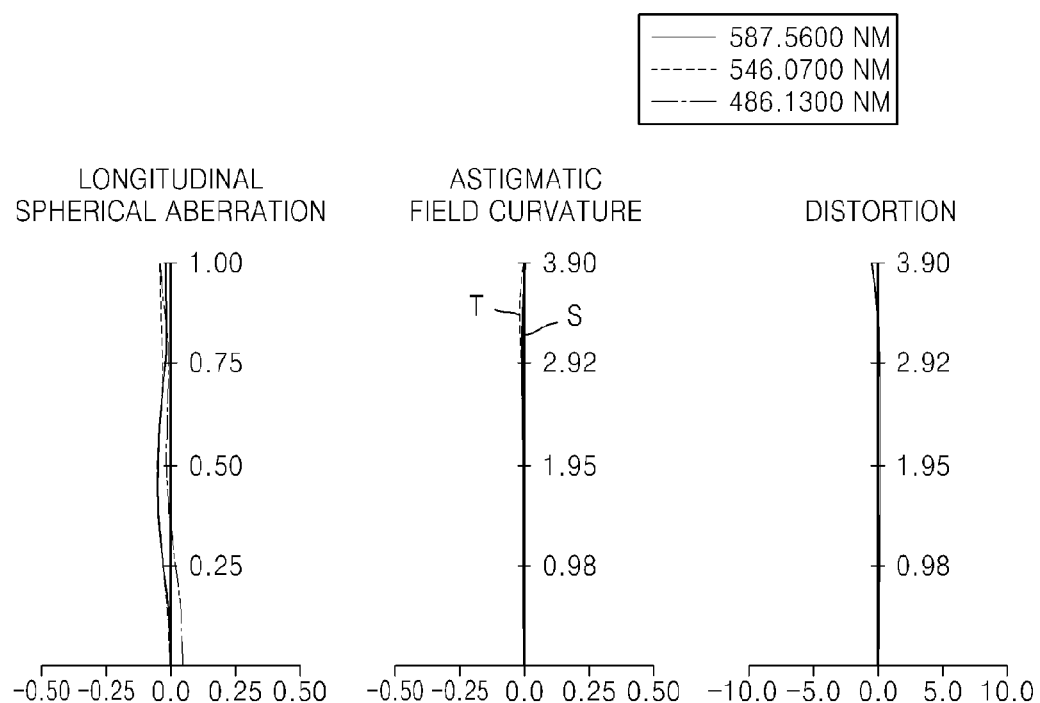

FIGS. 7A, 7B, and 7C illustrate longitudinal spherical aberration, astigmatic field curvature, and distortion of the first lens system 310a illustrated in FIG. 6A at a wide angle position, a middle position, and a telephoto position. FIG. 7D illustrates longitudinal spherical aberration, astigmatic field curvature, and distortion of the second lens system 310b illustrated in FIG. 6B at an ultra-wide angle position.

A lens system according to an embodiment of the invention may satisfy the following Equation 1:

$$0.6 < EFL_2/EFL_1 < 1.1 \qquad (1)$$

where $EFL_1$ represents the focal length of a first replacement lens group and $EFL_2$ represents the focal length of a second replacement lens group.

The first replacement lens group and the second replacement lens group of the lens system according to an embodiment of the invention may include at least one aspherical surface. The aspherical surface used in the lens system according to the invention is defined as follows.

When the direction of the optical axis is set to be an x axis direction, a direction perpendicular to the optical axis direction is set to be a y axis direction, and a proceeding direction of a light beam is set to be the positive x axis direction, the aspherical surface may be expressed as Equation 2:

$$x = \frac{cy^2}{1+\sqrt{1-(K+1)c^2y^2}} + Ay^4 + By^6 + Cy^8 + Dy^{10} \qquad (2)$$

where x denotes a distance from an apex of the lens along the x axis, y denotes a distance from the apex of the lens along the y axis, K denotes a conic constant, A, B, C, and D denote aspherical coefficients, and c denotes a reciprocal (1/R) of the radius of curvature of the apex of the lens.

Design data about the lens systems according to previous embodiments will now be described.

Hereinafter, EFL is referred to as the overall focal length of the lens system, FOV is referred to as a viewing angle, Fno is referred to as the F number, D1, D2, D3, and D4 are variable distances, and ST is referred to as a stop.

EMBODIMENT 1

|  | Wide angle position | Middle position | Telephoto position | Ultra-wide angle position |
|---|---|---|---|---|
| EFL(mm) | 6.389 | 8.367 | 13.358 | 5.899 |
| FOV(°) | 30.458 | 24.047 | 15.34 | 32.33 |
| Fno | 3.064 | 3.623 | 4.785 | 2.81 |

First sub lens system

| Lens surface | Radius of curvature | Thickness | Refractive index | Abbe's number |
|---|---|---|---|---|
| OBJECT | INFINITY | INFINITY | | |
| S1 | 132.88 | 0.6 | 1.495566 | 69.35 |
| S2 | 4.78 | 1.65 | | |
| S3 | 9.891 | 1.43 | 1.877961 | 37.24 |
| S4 | 16.732 | D1 | | |
| ST | INFINITY | 0.85 | | |
| S6 | 4.857 | 2 | 1.829807 | 43.66 |
| S7 | −433.408 | 0.26 | | |
| S8 | −29.832 | 0.5 | 1.789407 | 26.2 |
| S9 | 4.295 | 0.53 | | |
| S10 | 41.763 | 1.05 | 1.859422 | 41.98 |
| S11 | −11.721 | D2 | | |
| S12 | 24.246 | 1.63 | 1.487489 | 70.44 |
| S13 | −15.101 | D3 | | |
| S14 | INFINITY | 0.3 | | |
| S15 | INFINITY | 0.3 | | |
| S16 | INFINITY | 0.5 | | |
| S17 | INFINITY | | | |

Second sub lens system

| Lens surface | Radius of curvature | Thickness | Refractive index | Abbe's number |
|---|---|---|---|---|
| OBJECT | INFINITY | INFINITY | | |
| S1 | 132.88 | 0.6 | 1.495566 | 69.35 |
| S2 | 4.78 | 1.65 | | |
| S3 | 9.891 | 1.43 | 1.877961 | 37.24 |
| S4 | 16.732 | 11.79 | | |
| ST | INFINITY | 0.85 | | |
| S6_1 | 4.864 | 1.97 | 1.856413 | 42.14 |
| S7_1 | −10.356 | 0.1 | | |
| S8_1 | −11.344 | 1.41 | 1.771597 | 26.7 |
| S9_1 | 3.577 | 1.63 | | |
| S10_1 | 13.278 | 1.64 | 1.713000 | 53.94 |
| S11_1 | −14.33 | 4.49 | | |
| S12 | 24.246 | 1.63 | 1.487489 | 70.44 |
| S13 | −15.101 | 0.78 | | |
| S14 | INFINITY | 0.3 | | |
| S15 | INFINITY | 0.3 | | |
| S16 | INFINITY | 0.5 | | |
| S17 | INFINITY | | | |

Aspherical coefficient

|  | K | A | B | C | D |
|---|---|---|---|---|---|
| S3 | −1.000 | 2.998940000E−04 | −2.747663000E−05 | 2.664897000E−06 | −5.300000000E−08 |
| S4 | −1.000 | −1.650799000E−04 | −5.906264000E−05 | 5.257146000E−06 | −1.755917000E−07 |
| S6 | −1.000 | 5.129176000E−04 | 4.639619000E−05 | −9.815439000E−06 | 0.000000000E+00 |
| S7 | −1.000 | −2.985685000E−04 | −3.621516000E−05 | −3.920224000E−06 | −1.567144000E−07 |
| S6_1 | −1.075320 | 4.13313300E−04 | 2.58116000E−05 | −8.80802900E−06 | −1.23672100E−06 |
| S7_1 | −1.000000 | 5.17969300E−05 | −1.74421000E−05 | −1.46100800E−05 | −8.75617600E−07 |

Variable distance

| | | | |
|---|---|---|---|
| D1 | 12.02 | 8.887 | 3.83 |
| D2 | 3.366 | 7.584 | 14.071 |
| D3 | 5.148 | 3.853 | 2.084 |

EMBODIMENT 2

|  | Wide angle position | Middle position | Telephoto position | Ultra-wide angle position |
|---|---|---|---|---|
| EFL(mm) | 5.197 | 15.746 | 48.856 | 3.64 |
| FOV(°) | 37.236 | 14.082 | 4.622 | 47.336 |
| Fno | 3.307 | 4.952 | 6.258 | 4.88 |

First sub lens system

| Lens surface | Radius of curvature | Thickness | Refractive index | Abbe's number |
|---|---|---|---|---|
| OBJECT | INFINITY | INFINITY | | |
| S1 | 68.369 | 0.8 | 1.930235 | 24.65 |
| S2 | 25.674 | 1.8 | 1.496997 | 81.61 |
| S3 | 161.972 | 0.1 | | |
| S4 | 15.69 | 2.3 | 1.753753 | 52.36 |
| S5 | 82.65 | D1 | | |
| S6 | INFINITY | 0.33 | | |
| S7 | 489.43 | 0.9 | 1.854000 | 40.39 |
| S8 | 3.545 | 0.92 | | |
| S9 | 5.908 | 1.92 | 1.945945 | 17.98 |
| S10 | 11.566 | D2 | | |
| STOP (S11) | 5.054 | 1.8 | 1.553347 | 61.29 |
| S12 | −23.248 | 0.1 | | |
| S13 | 3.412 | 1.37 | 1.496997 | 81.61 |
| S14 | 10.195 | 0.45 | 1.942782 | 29.3 |
| S15 | 3.091 | D3 | | |
| S16 | −58.83 | 1.8 | 1.753901 | 52.34 |
| S17 | −9.368 | D4 | | |
| S18 | INFINITY | 0.3 | | |
| S19 | INFINITY | 0.6 | | |
| S20 | INFINITY | 0.5 | | |
| S21 | INFINITY | | | |

Second sub lens system

| Lens surface | Radius of curvature | Thickness | Refractive index | Abbe's number |
|---|---|---|---|---|
| OBJECT | INFINITY | INFINITY | | |
| S1 | 68.369 | 0.8 | 1.930235 | 24.65 |
| S2 | 25.674 | 1.8 | 1.496997 | 81.61 |
| S3 | 161.972 | 0.1 | | |
| S4 | 15.69 | 2.3 | 1.753753 | 52.36 |
| S5 | 82.65 | 0.6 | | |
| S6 | INFINITY | 0.33 | | |
| S7 | 489.43 | 0.9 | 1.854000 | 40.39 |
| S8 | 3.545 | 0.92 | | |
| S9 | 5.908 | 1.92 | 1.945945 | 17.98 |
| S10 | 11.566 | 10.66 | | |
| STOP (S11_1) | 2.097 | 1.33 | 1.516798 | 64.2 |
| S12_1 | 4.051 | 0.1 | | |
| S13 | INFINITY | 1.37 | | |
| S14 | INFINITY | 0.45 | | |
| S15 | INFINITY | 0.4 | | |
| S16 | −58.83 | 1.8 | 1.753901 | 52.34 |
| S17 | −9.368 | 2.24 | | |
| S18 | INFINITY | 0.3 | | |
| S19 | INFINITY | 0.6 | | |
| S20 | INFINITY | 0.5 | | |
| S21 | INFINITY | | | |

Aspherical coefficient

| Lens surface | K | A | B | C | D |
|---|---|---|---|---|---|
| S4 | −0.63221 | −1.422694E−05 | 1.334598E−07 | −6.636598E−10 | 7.239131E−11 |
| S5 | −1.00000 | −2.983334E−05 | 2.328474E−07 | 2.070468E−09 | 3.339062E−11 |
| S7 | −1.00000 | −8.229495E−04 | 1.311537E−05 | −6.610226E−08 | 0.000000E+00 |
| S8 | −1.00000 | −8.766602E−04 | 5.763817E−05 | −2.342991E−06 | 4.425263E−08 |
| S9 | −1.55284 | −9.188234E−04 | 8.803481E−05 | −2.550899E−06 | 8.650720E−08 |
| S10 | −16.69372 | −3.356045E−04 | 2.326636E−05 | −1.029444E−06 | 9.301384E−08 |
| 511 | −1.00000 | 2.378175E−03 | 1.309066E−04 | 3.619513E−05 | 0.000000E+00 |
| S12 | −1.00000 | 3.560572E−03 | 1.059166E−04 | 7.564806E−05 | 0.000000E+00 |

-continued

| | | | | |
|---|---|---|---|---|
| S16 | −8.24845 | 8.458982E−04 | −1.091839E−05 | 9.162983E−07 | −1.815530E−08 |
| S17 | 0.29449 | 1.254489E−03 | −2.777532E−05 | 1.735488E−06 | −3.120650E−08 |
| S11_1 | −1.00000 | 1.769486E−02 | 5.650847E−03 | −4.179510E−04 | 0.000000E+00 |
| S12_2 | −1.00000 | 3.146403E−02 | 1.737050E−02 | −4.580203E−03 | 0.000000E+00 |

| Variable distance | | | |
|---|---|---|---|
| D1 | 0.6 | 7.546 | 15.32 |
| D2 | 13.132 | 5.848 | 0.6 |
| D3 | 3.766 | 10.182 | 14.936 |
| D4 | 3.081 | 3.485 | 1.453 |

EMBODIMENT 3

| | Wide angle position | Middle position | Telephoto position | Ultra-wide angle position |
|---|---|---|---|---|
| EFL(mm) | 4.43 | 14.882 | 49.917 | 3.911 |
| Fov(°) | 41.36 | 14.685 | 4.467 | 44.916 |
| Fno | 3.146 | 4.95 | 6.076 | 3.215 |

| First sub lens system | | | | |
|---|---|---|---|---|
| Lens surface | Radius of curvature | Thickness | Refractive index | Abbe's number |
| OBJECT | INFINITY | INFINITY | | |
| S1 | 26.542 | 0.9 | 1.883420 | 24.07 |
| S2 | 17.277 | 3.26 | 1.496997 | 81.61 |
| S3 | 78.367 | 0.1 | | |
| S4 | 18.485 | 2.44 | 1.773095 | 49.07 |
| S5 | 53.626 | D1 | | |
| S6 | 101.275 | 0.6 | 1.910822 | 35.25 |
| S7 | 4.848 | 2.44 | | |
| S8 | −13.749 | 0.8 | 1.714575 | 53.75 |
| S9 | 21.389 | 0.1 | | |
| S10 | 13.661 | 1.4 | 1.945945 | 17.98 |
| S11 | −97.875 | D2 | | |
| STOP | INFINITY | 0.6 | | |
| S13 | 5.28 | 2.22 | 1.584180 | 47.63 |
| S14 | −10.289 | 0.12 | | |
| S15 | 5.606 | 1.21 | 1.496997 | 81.61 |
| S16 | −16.506 | 0.44 | 1.680928 | 27.96 |
| S17 | 3.432 | D3 | | |
| S18 | 15856.073 | 2.1 | 1.500831 | 80.56 |
| S19 | −7.537 | D4 | | |
| S20 | INFINITY | 0.8 | | |
| S21 | INFINITY | | | |

| Second sub lens system | | | | |
|---|---|---|---|---|
| Lens surface | Radius of curvature | Thickness | Refractive index | Abbe's number |
| OBJECT | INFINITY | INFINITY | | |
| S1 | 26.542 | 0.9 | 1.883420 | 24.07 |
| S2 | 17.277 | 3.26 | 1.496997 | 81.61 |
| S3 | 78.367 | 0.1 | | |
| S4 | 18.485 | 2.44 | 1.773095 | 49.07 |
| S5 | 53.626 | 0.61 | | |
| S6 | 101.275 | 0.6 | 1.910822 | 35.25 |
| S7 | 4.848 | 2.44 | | |
| S8 | −13.749 | 0.8 | 1.714575 | 53.75 |
| S9 | 21.389 | 0.1 | | |
| S10 | 13.661 | 1.4 | 1.945945 | 17.98 |
| S11 | −97.875 | 7.51 | | |
| STOP | INFINITY | 0.6 | | |
| S13_1 | 15.111 | 2.42 | 1.767638 | 45.95 |
| S14_1 | −3.612 | 0.1 | | |
| S15_1 | 18.859 | 1.08 | 1.496997 | 81.61 |
| S16_1 | −4.432 | 0.4 | 1.651573 | 28 |
| S17_1 | 3.832 | 2.86 | | |
| S18 | 15856.073 | 2.1 | 1.500831 | 80.56 |
| S19 | −7.537 | 2.69 | | |

-continued

| | | |
|---|---|---|
| S20 | INFINITY | 0.8 |
| S21 | INFINITY | |

| Aspherical coefficient | | | | | |
|---|---|---|---|---|---|
| | K | A | B | C | D |
| S8 | 0.06183 | −4.337299E−05 | −5.104070E−06 | 3.367088E−07 | 0.000000E+00 |
| S9 | −1.00000 | −2.959611E−04 | 0.000000E+00 | 0.000000E+00 | 0.000000E+00 |
| S13 | −1.00000 | −1.347019E−04 | −8.528949E−05 | 1.188162E−05 | −1.161240E−06 |
| S14 | −1.00000 | 2.493809E−04 | −4.884100E−05 | −6.702691E−07 | 0.000000E+00 |
| S19 | −0.94765 | 4.014897E−04 | −1.334962E−05 | 1.271640E−07 | 1.358574E−09 |
| S13_1 | −1.00000 | −7.004341E−03 | −2.630188E−03 | 7.293148E−04 | −2.232333E−04 |
| S14_1 | −1.00000 | −3.837347E−03 | −5.330083E−04 | −2.806344E−05 | 0.000000E+00 |

| Variable distance | | | |
|---|---|---|---|
| D1 | 0.489 | 8.407 | 16.799 |
| D2 | 11.054 | 4.452 | 0.1 |
| D3 | 3.91 | 12.407 | 16.85 |
| D4 | 3.83 | 3.687 | 2.136 |

As described above, a lens system according to an embodiment of the invention may achieve different types of focal lengths by using only a single lens system and may still be manufactured to be compact and thin.

Figure 8:
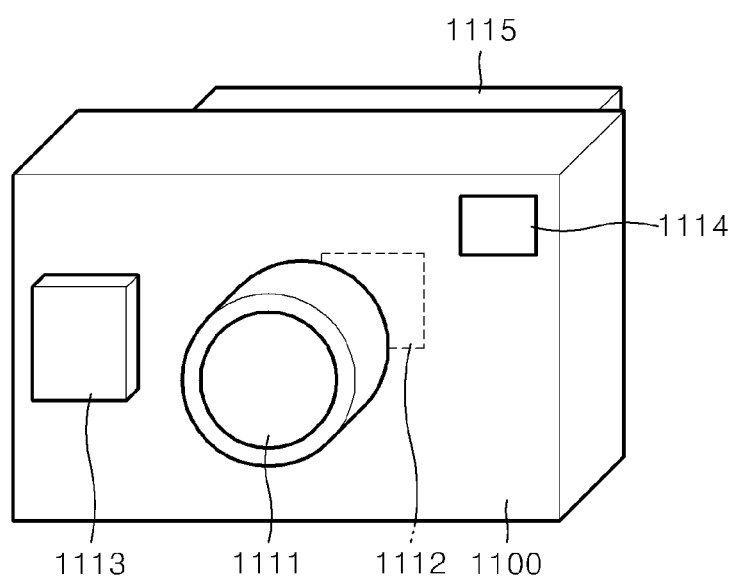
FIG. 8 is a front-left perspective view of a photographing apparatus according to an embodiment of the invention.

FIG. 8 schematically illustrates a photographing apparatus 1100 including a lens system 1111, according to an embodiment of the invention. The photographing apparatus 1100 includes the lens system 1111, and an imaging device 1112 for converting an image formed by the lens system 1111 into an electrical signal. Examples of the lens system 1111 includes the lens systems described above with reference to FIGS. 1, 2A, 2B, 4A, 4B, 6A, and 6B. The photographing apparatus 1100 may include a recording unit 1113 in which information corresponding to a subject image photoelectrically converted by the imaging device 1112 is recorded, a viewfinder 1114 for observing the subject image, and a display unit 1115 on which the subject image is displayed. Although the viewfinder 1114 and the display unit 1115 are separately provided in FIG. 8, the present embodiment is not limited thereto and only the display unit 1115 may be provided without the viewfinder 1114. The lens system 1111 can be retracted so as to be received within the main body of the photographing apparatus 1100. Although the photographing apparatus 1100 of FIG. 8 is exemplarily shown, the present embodiment is not limited thereto and any of various other optical equipments may be used. If a zoom lens according to the invention is applied to photographing apparatuses, such as a digital camera, an optical equipment that is compact and inexpensive, has a bright lens system, and achieves wide angle photographing is provided.

A photographing apparatus according to an embodiment of the invention achieves various focal lengths by simply replacing some lens groups without needing to replace the entire lens system, thereby satisfying various user's demands at low costs. In addition, since a user does not need to carry two separate lens systems having two types of focal lengths, the user can very conveniently use a photographing apparatus according to the invention.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A lens system comprising:
a first sub lens system that comprises at least one lens group and a first replacement lens group and performs zooming between a wide angle position and a telephoto position; and
a second sub lens system that shares the at least one lens group with the first sub lens system, comprises a second replacement lens group that replaces or is replaced by the first replacement lens group, and has a focal length shorter than a focal length of the first sub lens system at the wide angle position,
wherein:
the first sub lens system comprises a first lens group having a negative refractive power, a second lens group having a positive refractive power, and a third lens group having a positive refractive power; and
the second replacement lens group replaces or is replaced by the second lens group or the third lens group.

2. The lens system of claim 1, wherein when the first sub lens system performs zooming from the wide angle position to the telephoto position, an interval between the first lens group and the second lens group decreases and an interval between the second lens group and the third lens group increases.

3. The lens system of claim 1, wherein the third lens group performs focusing.

4. The lens system of claim 1, wherein:
the first sub lens system comprises a first lens group having a positive refractive power, a second lens group having a negative refractive power, a third lens group having a positive refractive power, and a fourth lens group having a positive refractive power; and
the second replacement lens group replaces or is replaced by the third lens group or the fourth lens group.

5. The lens system of claim 4, wherein the second replacement lens group comprises one lens.

6. The lens system of claim 5, wherein the second sub lens system has a viewing angle of 90 degrees or greater.

7. The lens system of claim 5, wherein the second sub lens system has a distortion of 15% or greater.

8. The lens system of claim 1, wherein the first replacement lens group and the second replacement lens group comprise at least one aspherical surface.

9. The lens system of claim 1, wherein the lens system satisfies the following equation:

$$0.6 < EFL2/EFL1 < 1.1$$

where EFL1 represents a focal length of the first replacement lens group and EFL2 represents a focal length of the second replacement lens group.

10. A lens system comprising:
a first sub lens system that comprises at least one lens group and a first replacement lens group and performs zooming between a wide angle position and a telephoto position; and
a second sub lens system that shares the at least one lens group with the first sub lens system and comprises a second replacement lens group that replaces or is replaced by the first replacement lens group,
wherein:
the first replacement lens group comprises a first stop located on an object side of the first replacement lens group, the first stop moves with the first replacement lens group,
the second replacement lens group comprises a second stop located on an object side of the second replacement lens group, and,
when the first replacement lens group is replaced by the second replacement lens group, the first stop is replaced with the second stop and the second sub lens system has an F number smaller than an F number of the first sub lens system at the wide angle position.

11. The lens system of claim 10, wherein the second sub lens system has a focal length shorter than a focal length of the first sub lens system at the wide angle position.

12. The lens system of claim 10, wherein:
the first sub lens system comprises a first lens group having a negative refractive power, a second lens group having a positive refractive power, and a third lens group having a positive refractive power; and
the second replacement lens group replaces or is replaced by the second lens group or the third lens group.

13. The lens system of claim 10, wherein:
the first sub lens system comprises a first lens group having a positive refractive power, a second lens group having a negative refractive power, a third lens group having a positive refractive power, and a fourth lens group having a positive refractive power; and
the second replacement lens group replaces or is replaced by the third lens group or the fourth lens group.

14. The lens system of claim 13, wherein the second replacement lens group is formed of a single lens.

15. The lens system of claim 13, wherein the second sub lens system has a viewing angle of 90 degrees or greater.

16. The lens system of claim 13, wherein the second sub lens system has a distortion of 15% or greater.

17. The lens system of claim 10, wherein the lens system satisfies the following equation:

$$0.6 < EFL2/EFL1 < 1.1$$

where EFL1 represents a focal length of the first replacement lens group and EFL2 represents a focal length of the second replacement lens group.

18. A photographing apparatus comprising:
a lens system; and
an imaging device for converting an image formed by the lens system into an electrical signal,
wherein the lens system comprises:
a first sub lens system that comprises at least one lens group and a first replacement lens group and performs zooming between a wide angle position and a telephoto position; and
a second sub lens system that shares the at least one lens group with the first sub lens system, comprises a second replacement lens group that replaces or is replaced by the first replacement lens group, and has a focal length shorter than a focal length of the first sub lens system at the wide angle position, and
wherein the lens system satisfies the following equation:

$$0.6 < EFL2/EFL1 < 1.1$$

where EFL1 represents a focal length of the first replacement lens group and EFL2 represents a focal length of the second replacement lens group.

\* \* \* \* \*